June 28, 1955 W. G. ROWELL 2,711,696
FLUID PUMPING MECHANISM AND CONTROL APPARATUS
Filed March 3, 1951 5 Sheets-Sheet 1

Inventor
William G. Rowell
by Attorney

June 28, 1955  W. G. ROWELL  2,711,696
FLUID PUMPING MECHANISM AND CONTROL APPARATUS
Filed March 3, 1951  5 Sheets-Sheet 2

June 28, 1955  W. G. ROWELL  2,711,696
FLUID PUMPING MECHANISM AND CONTROL APPARATUS
Filed March 3, 1951  5 Sheets-Sheet 5

Inventor
William G. Rowell
By Munn W. Hamilton
Attorney

United States Patent Office 2,711,696
Patented June 28, 1955

2,711,696

FLUID PUMPING MECHANISM AND CONTROL APPARATUS

William G. Rowell, Wollaston, Mass., assignor of forty-five per cent to Munroe H. Hamilton, Lexington, Mass.

Application March 3, 1951, Serial No. 214,617

10 Claims. (Cl. 103—.27)

This invention relates to a fluid pumping mechanism and control apparatus, and more particularly to a novel combination of tank truck pumping mechanism and control apparatus which may be utilized in making tank truck deliveries of fuel oil and various other fluid bodies, having in mind especially those situations where the deliveries are required to be made subject to the control of a metering unit.

In operating fuel oil tank trucks of the conventional type and pumping fuel oil from the tank truck through a hose line to the supply tank of the consumer, there have developed certain problems involving costly wear of the pumping mechanism, excessive gasolene consumption by the truck engine, and consumption of relatively large amounts of the operator's time for each delivery made. This develops partly from the nature of the job calling for safety and exercise of great care; partly due to the fact that the fuel oil pumps employed are almost always driven from the truck motor for economic reasons; and partly due to the sequence of steps necessarily followed by tank truck drivers in operating standard metering equipment which must be used in accordance with statutory requirements.

Because the problems are of long standing, and because many attempts have been made to deal with them, with little success being realized, it is helpful to note the various factors involved. The usual practice of tank truck drivers upon reaching a delivery destination is to set the engine at a suitable idling speed and to engage a special gear drive on the truck, called the "power take-off," with a moving part of the truck transmission. This allows the truck engine to drive an auxiliary pumping mechanism which is mounted at some convenient point on the truck. As soon as the pump starts a relatively high pressure is built up in the flow line, forcing oil against a closed valve at the nozzle end of the flow line or a meter valve, if the latter is in a closed position.

With the pump running, the driver leaves the cab, unreels the hose line and carries the nozzle to the fill pipe of the customer's tank. If the tank is equipped with a whistling signal of the customary type, which indicates when the tank is full, the driver may then open a hand valve in the end of the nozzle and the delivery is started. If the tank has no whistling signal, the driver will first have to take the time to enter the customer's dwelling and inspect the tank in order to find out how much oil is required, and then set the meter.

After the requisite amount of oil has been delivered, the driver can either close the nozzle at the fill pipe, drag the hose back to the truck and shut off the motor and pumping mechanism, or he may leave the motor and pump running after the nozzle is closed while he delivers a sales slip for the oil delivery made, and thereafter reel in the hose, enter the cab, disengage the power take-off, and thus stop the pump.

It will be apparent from the above that there are several intervals of varying length during which the pump is working against a closed valve in the nozzle or at the meter. Having in mind the large number of deliveries made each day, it will be seen that over considerable periods of time the truck engine is consuming gasolene without performing useful work, and it will be appreciated that this is a most harmful type of operation for the pumping mechanism which has been found to necessitate frequent and expensive repairs on this equipment.

It is an object of the present invention to deal with the problems indicated and to provide an improved fluid pumping mechanism and control apparatus. The invention especially aims to devise a novel combination of tank truck pumping mechanism and control apparatus which will make it possible for oil to be pumped in a more efficient and controlled manner and, moreover, will make it possible to avoid unnecessary operation of the trunk engine and the pump mechanism, with the latter working against a closed valve. Another object of the invention is to provide a rugged, easily installed, and relatively simple control apparatus which does not interfere with statutory metering requirements and which can be readily applied to substantially all conventional types of tank trucks.

These and other objects and novel features will be more fully understood and appreciated from the following description of a preferred embodiment of the invention selected for purposes of illustration and shown in the accompanying drawings, in which.

The present invention is based upon the novel concept of combining a tank truck pumping mechanism and its flow line with means for utilizing the pressure fluctuations which take place in the flow line, as fluid material alternately flows and stops, in order to automatically control the starting and stopping of the truck engine with the power take-off engaged in driving relationship with the pumping mechanism and, as a consequence of this operation, to simultaneously control the delivery of oil from the nozzle of the flow line in a selective manner.

In thus attempting to simultaneously control from one actuating source, i. e. the nozzle, two completely different instrumentalities of relatively complex operating characteristics, there develop conditions of an unexpectedly troublesome nature, both with respect to the pressure fluctuations in the flow line which are to be utilized, and in connection with the operation of the truck engine and pumping mechanism.

I have found that these conditions may be successfully dealt with and selective pumping of oil, or other fluid, may be automatically controlled to an extent such that the operation becomes practically feasible for tank truck deliveries by combining the pumping mechanism with a special pressure sensitive apparatus which introduces controls at several different points in the pumping system. The pressure sensitive apparatus includes, in general, a pressure sensitive element and cooperating mechanical parts, as well as novel electrical circuits and circuit elements, which enable the pressure sensitive element to function properly and which ensure that the operating parts of the pump and the truck engine perform their normal function without interference.

Figure 1:
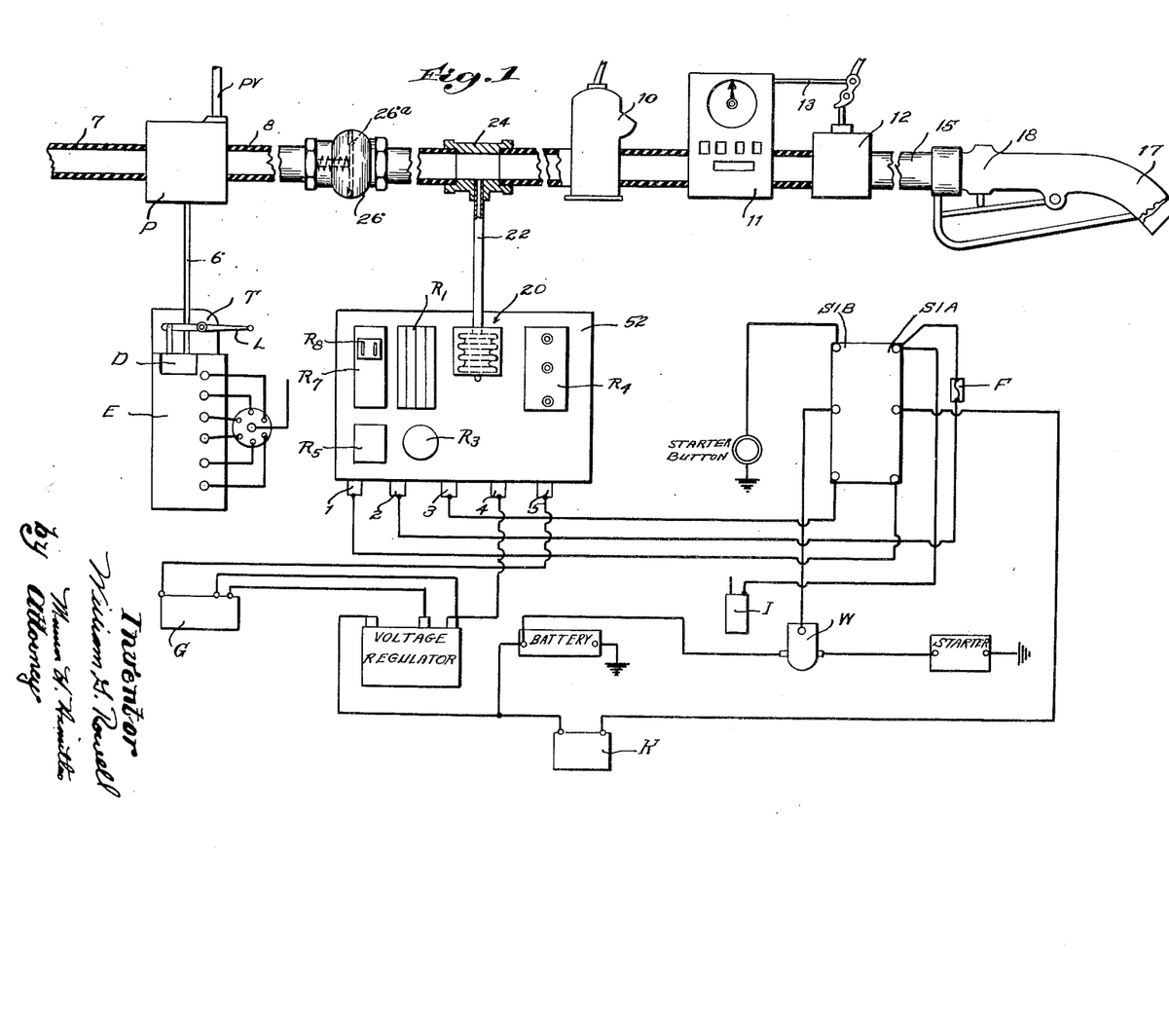
Fig. 1 is a diagrammatic view illustrating a flow line including parts of a tank truck pumping mechanism with which has been combined control apparatus for controlling movement of a fluid body through the flow line.
Figure 2:
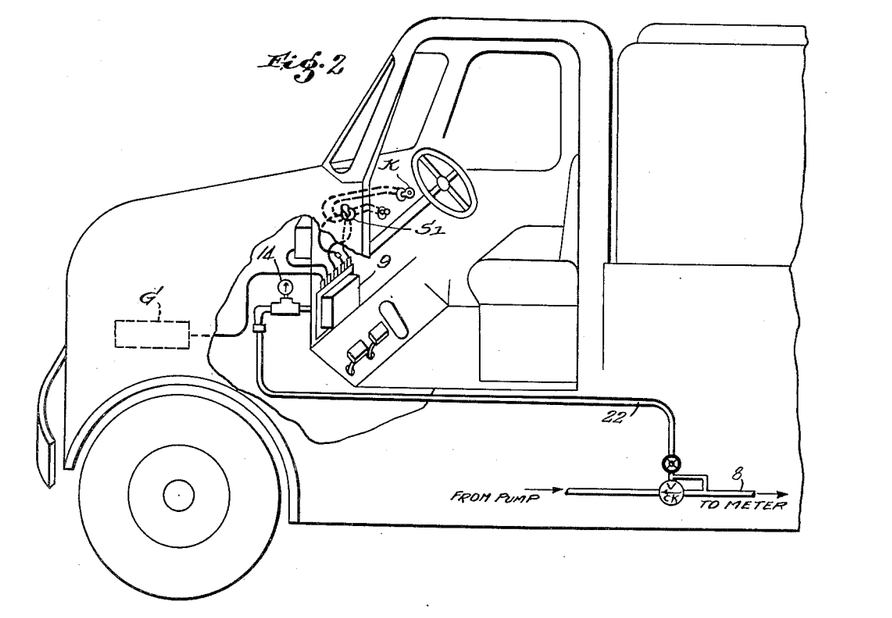
Fig. 2 is a fragmentary side elevational view diagrammatically illustrating a typical tank truck equipped with the combination pumping mechanism and control apparatus of the invention.
Figure 3:
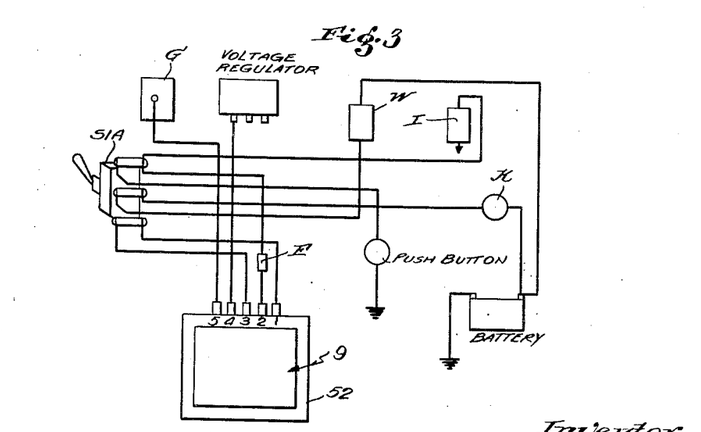
Fig. 3 is a wiring diagram illustrating particularly electrical connections for part of the starting circuit control of the apparatus.

In the structure shown in Fig. 1 of the drawings there has been illustrated diagrammatically one desirable arrangement of the combination pumping mechanism and control apparatus of the invention with the pumping mechanism being shown at the upper side of the figure, while the mechanical components of the control apparatus are shown in a position somewhat centrally of Fig. 1. The electrical components appear at the lower part of the sheet connected together with the various operating parts. Fig. 2 is further illustrative of one suitable arrangement of the control apparatus in the cab section of a tank truck.

In Fig. 1 the letter E denotes a portion of a truck engine such as is commonly found on trucks used to make retail oil deliveries. A transmission T is driven by the truck engine E and the transmission operates a separate driving unit D which is commonly referred to in the trade as a power take-off. As shown in Fig. 1 a lever L permits the driving unit to be moved into and out of engagement with a pump P, for example, of the positive displacement type commonly used on tank trucks. The pump is mechanically connected to the power take-off by a drive shaft 6 and has a standard by-pass relief valve PV.

The pump P draws oil from a tank on the truck through a suction line 7 and delivers the oil along a flow line 8. If desired there may be employed an air eliminator and strainer 10 of conventional character, and adjacent to the air eliminator 10 there may also be provided a standard metering mechanism 11 having a spring operated stop valve 12 and latch rod 13 controlled by the metering mechanism.

A hose 15 is connected to the pipe line leading from the valve 12 and a section of the hose (not shown) is normally supported in coiled relationship about a reel which is customary as a part of the truck equipment. At the end of the hose is a nozzle 17 equipped with a hand operated valve 18. It should be understood that in some cases it may be desired to operate the pumping mechanism without the air eliminator and strainer combination and also without the metering mechanism 11. However, the invention will be described, having reference to that type of truck equipment which includes these devices as a standard part of the unit.

The pumping and metering mechanism may be of any well known construction which meets with statutory requirements for tank truck equipment of this class and which will ensure a correct metering of oil deliveries. The stop valve and latch rod 13 ordinarily enable a driver to set the meter for any predetermined number of gallons of fluid which may be required. When the prescribed volume of oil has passed through the meter the latch mechanism will cause the auto stop valve to close and thus limit delivery to just this amount. Such a procedure may also be carried out with the combination apparatus of the invention. However, in many instances this procedure may be replaced by a more efficient handling of the metering equipment, or by operating independently of it, as will appear from the following description.

In accordance with the invention I combine with the pumping mechanism described above the pressure sensitive control apparatus already referred to, the principal component of which is a pressure sensitive switch which may, for example, be a switch of the bellows type. The pressure switch and certain other electrical components of the invention are contained in a control box 9 which may be located at some convenient point, as in the cab, in the position shown in Fig. 2.

In thus combining a pressure sensitive switch with the pumping mechanism so that the switch can accurately respond to those changes in the pressure in the flow line which are initiated by opening and closing the valve 18 in the nozzle 17, it is essential that the pressure sensitive switch be located on the discharge side of the pump and between this member and the valve 18. Moreover, in the case of a flow line which is equipped with either or both an air eliminator and meter, such as the devices represented in Fig. 1 by numerals 10 and 11, it is further essential that the pressure sensitive switch be connected between the pump and whichever of these devices is nearest to the pump.

The latter arrangement has been illustrated in Fig. 1 of the drawings and, as shown therein, the pressure sensitive switch, denoted in Fig. 1 by the arrow 20, is indicated diagrammatically and is shown connected by means of a small orifice tube 22 to a coupling means 24, in turn connected into the flow line 8 in the specified relationship to the pump and air eliminator. Also provided is a gauge 14 to indicate pressure in the flow line at any time. An important advantage of this arrangement of the pressure sensitive switch between the pump and meter is that the meter valve 12 may assume master control of the switch when a specified number of gallons have been delivered and yet the meter valve may be held out of operation at all other times.

In providing a pressure switch for use with the flow line 8, consideration must also be given to the specific operating conditions which may prevail from time to time in the line. For example, in relying upon a drop in pressure to actuate the truck engine, regard must be had for the possibility of pressure drop developing accidentally, or as a result of unusual conditions in the flow line.

One instance of such a situation is present in connection with the structural characteristics of the pump 5. This device, which is representative of most pumps now found on tank trucks is of the positive displacement type and may, when at rest, be subject to some falling off of pressure taking place due to fluid moving back through the pumping mechanism. This, it is found, can produce an appreciable drop in pressure which will interfere with the functioning of the switch 20, raising the possibility of starting the truck engine at times when such an operation is not desired.

I have provided means for preventing a pressure drop from taking place in this way and I accomplish this by installing in the flow line 8, between the pump P and the portion of the line into which the pressure switch is connected, a check valve 26, as shown in Fig. 1. This member is of rugged construction having, for example, a two inch bore threaded at either end for engagement with adjacent sections of the flow line 8 and fitted internally with a spring-held valve cap 26a which is set to normally lie in seated relation against its valve seat and which may be adjusted to open at a pressure of, for example, 1–5 lbs., or greater. By means of this arrangement the action of the pump P is not appreciably impeded and yet the pressure which is developed in the line between the check valve 26 and the valve 18 is positively maintained and may exert itself against the pressure sensitive switch 20 to hold this member in a desired position.

A second consideration in designing a pressure sensitive switch for use in the type of pumping equipment indicated has to do with operating pressure ranges which are commonly utilized in making oil tank truck deliveries. A typical tank truck oil pump, for example, may develop an average pumping pressure of in the neighborhood of 30 lbs. in delivering oil through a flow line. This average pumping pressure of course varies with the speed at which the truck engine is operated, and in many instances the operator may wish to increase the pumping speed by accelerating the truck engine. Such an acceleration may easily raise the pumping pressure in the line from, say 30 to 40 or 45 lbs., or even higher. Also, when the flow line is closed these pressures may rise considerably. The by-pass relief valve PV is usually set to release pressures in excess of from 45 to 50 lbs.

Pressure sensitive switches are commonly employed in other fields and these switches customarily have a single adjustment to provide an operating range of, roughly, 10 lbs. pressure differential. For instance, such a switch might be set at a cut-out point of from 45 to 50 lbs. so that as pressure rises to this value the engine would be stopped. The cut-in point with this type of switch would then occur at from 35 to 45 lbs. and a pressure drop to these values would cause the engine to start.

I find that such a single adjustment type of pressure switch with its limited differential range, as noted, is subject to several objections in practical use. If the driver wants to pump faster, as he frequently does, he necessarily raises the pressure and quickly approaches the cut-off point where he raises the likelihood of stopping the truck engine before this faster pumping is accomplished. As a practical result, therefore, he has to slow down his delivery rate. On the other hand, if the switch is adjusted to a higher cut-off point with the 10 lb. differential range noted, the driver will run the risk of having any small drop in pressure cause the truck engine to run when it should not. As a practical matter it is found that even a small leakage of oil through the mechanical equipment can produce a pressure drop of as great as 20 lbs. in a very short span of time. Similarly, it is found that a considerable drop in pressure sufficient to start the engine can occur in connection with unreeling the hose from the truck reel since the hose in an unreeled condition will hold more oil. Either of these eventualities must be guarded against and cannot be satisfactorily taken care of by the conventional differential range described.

In the present invention I provide in the pressure sensitive switch 20 two separate adjustments which allow the switch to operate so as to cut out and stop the engine at pressures as high as 80 lbs. and which will also cut in and start the engine at pressures as low as 5 lbs. As a result of the dual adjustment pressure switch arrangement, a wide differential range of, roughly, 70 lbs. is available.

The wider range makes it possible for the driver to pump faster and thereby vary the truck pumping pressures through a considerable range which easily includes most pumping pressues of pumps as employed on tank trucks at the present time. Of equal importance is the fact that the lower cut-in point achieved by the second adjustment in the switch completely avoids difficulty from leaking of oil or from accidental drop in pressure through hose unreeling, or in other ways.

Figures 6, 7, 8, 18, 19, 20:
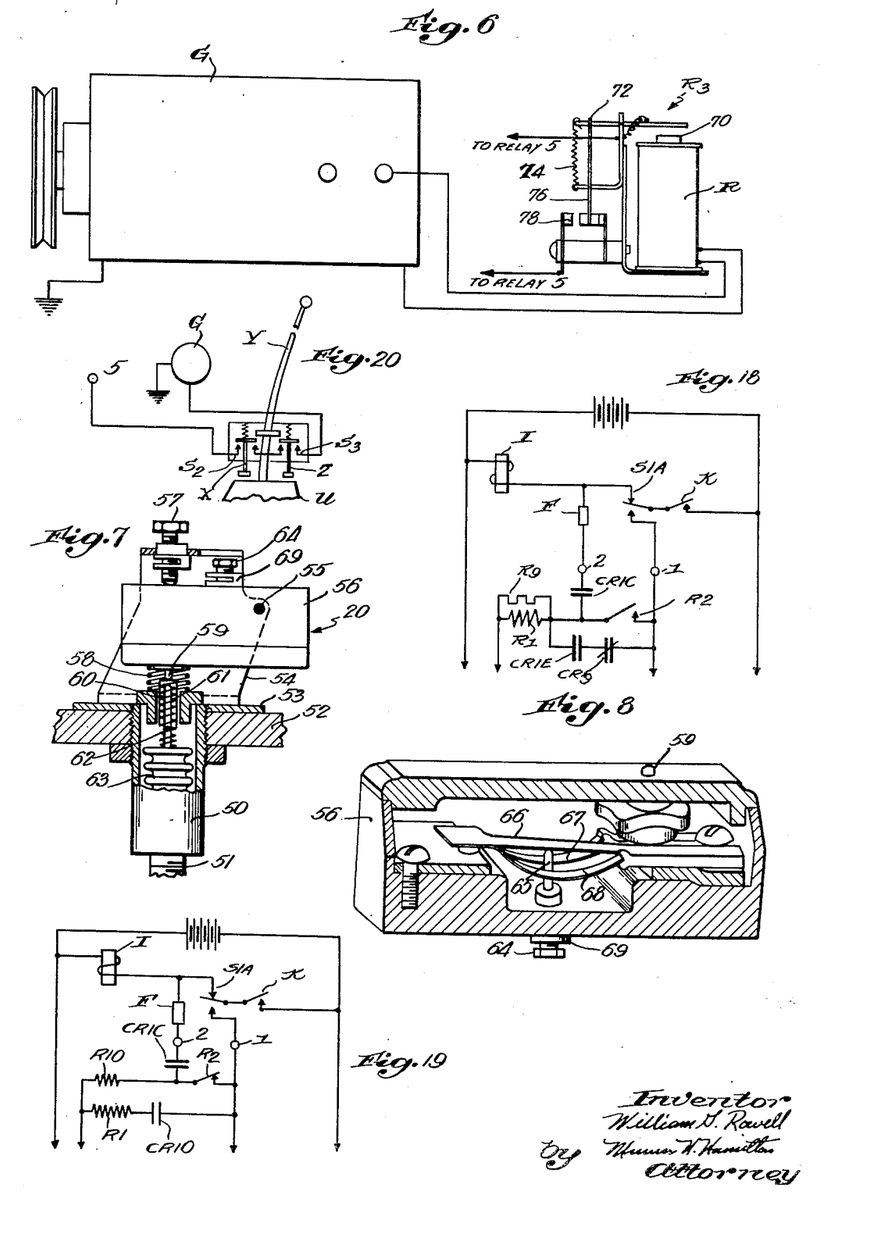
Fig. 6 is a schematic wiring diagram of sensitive relay means showing details of the construction and electrical connections for this part of the invention.
Fig. 7 is a detail cross-sectional view taken vertically through the pressure switching means of the invention.
Fig. 8 is a detail perspective view, partly in cross-section, showing novel means of adjusting the contacts of the switch illustrated in Fig. 7.
Fig. 18 is a wiring diagram of a thermal time delay circuit.
Fig. 19 is a wiring diagram of a slow release relay circuit which produces a time delay.
Fig. 20 is a schematic wiring diagram of a combined gear shift lever and switch arrangement.

Details of the improved pressure switch 20, including the dual adjustment mechanism, have been illustrated in Figs. 7 and 8. As shown in Fig. 7, a cylindrical casing 50 having a threaded end 51 for connection with the small orifice tube 22 is normally supported in a base 52 of the control box or cabinet 9 by means of an annular plate 53 on which is screwed a U-shaped bracket 54. Between the sides of the U-shaped bracket 54 is pivotally mounted at 55 a switch 56. A cutting out adjustment screw 57 bears against the top of the pivoted switch 56, forcing the switch downwardly against the holding action of a spring 58. A pin 59 is engaged by a cylindrical cap 60 which is resiliently mounted on a spring 61 and surrounds a plunger rod 62 which is connected to a bellows 63 in the bottom of the cylindrical casing 50.

In Fig. 8 the switch 56 has been shown partly in cross-section in an upended position to disclose a second adjustment screw arrangement which is a cutting in adjustment and which includes adjustment screw 64 threaded into a bushing 69 mounted on the switch body. The screw 64 has a pin 65 which engages against a movable contact spring 66. The latter member extends between two parallel contact springs 67 and 68.

The contacts in switch 56 are normally closed and when a predetermined amount of pressure is exerted by the plunger rod 62 from bellows 63, the contacts open and stop the truck engine. The pressure point at which this occurs depends on the position of the switch on its pivot 55 which, in turn, is determined by the setting of the cutting out adjustment screw 57.

It is pointed out that I provide through the cut-in adjustment screw 64 a definite control of the flexing of the operating spring 66 in the switch. By changing the flexing characteristics of the spring 66, as occurs from directing the adjustment screw into engagement with the spring 66 at a point intermediate its ends, I am enabled to change the point at which it will close. I make use of this latter fact to increase the range or differential so that the controls do not operate until a pressure has been reached corresponding to the setting of the screw 57 at the cut-off point desired. I accomplish this by adjusting the cut-off adjustment screw 57 at any desired high pressure point and adjusting the second adjustment screw 64 to cut in at any desired low pressure point independently of the setting of the high pressure point. For example, I may set the adjustment screw 57 at a cut-off pressure point of as high as 80 lbs. and set the cut-in adjustment screw 64 at a cut-in pressure point of 5 lbs.

Still another instance of unusual pressure conditions which have been found to develop in a tank truck flow line is the building up of sudden pressure surges which are able to momentarily cut out the truck engine just after the pumping cycle starts and before the pumping pressure has a chance to be equalized throughout the line. A condition which produces such a pressure surge is found to develop from a quick build-up of pressure when the pump is working against the inertia of the fluid in the flow line. Tests have shown that relatively large pressure surges, sometimes running as high as 70 or 80 lbs., or more, are generated momentarily and when reaching such an intensity will exceed the capacity of the by-pass valve for a short interval long enough to cut off the truck engine. Then, as pressure starts to drop, the system starts the engine again and this starting and stopping cycle, if not prevented, may be repeated over and over, thus resulting in a loss of control.

I have found that these pressure surges, as well as other pressure fluctuations developing in the line at one time or another, may be controlled by providing pressure surge control means which may be mechanical or electrical in nature. The surge control means in one simple form may, for example, comprise a snubbing device including a connector having a restricted passageway such as the small orifice tube 22 shown in Fig. 1. The effect of this small orifice tube is to retard and smooth out pressure fluctuations and thus prevent the valve from being subject to momentary accidental operation.

Figures 9, 10:
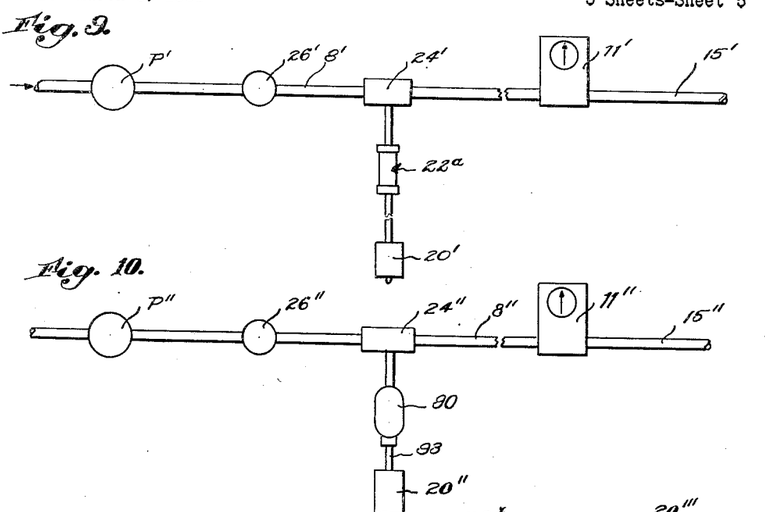
Figs. 9, 10 and 11 are diagrammatic views, generally similar to parts of Fig. 1, but showing additional mechanical components utilized in modified forms of the invention.
Figures 11, 12, 13, 14, 15, 16, 17:
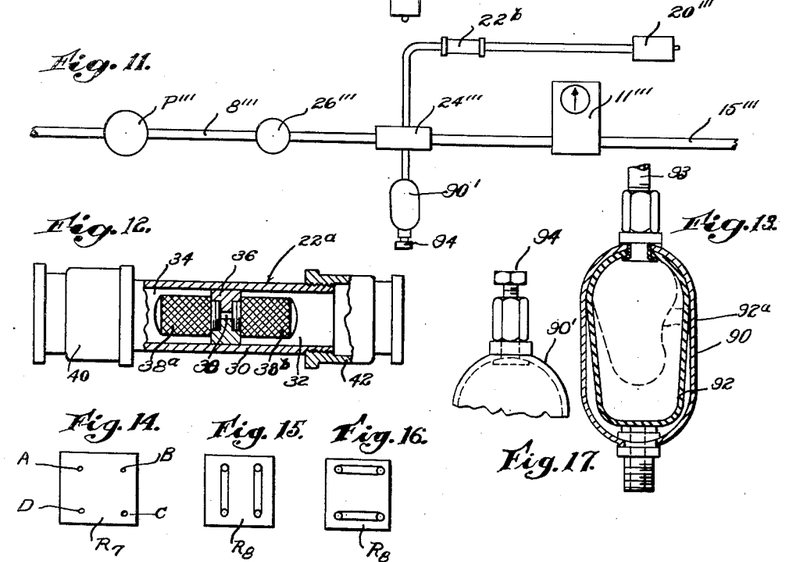
Fig. 12 is a side elevational view, partly in cross-section, showing in detail one type of pressure snubber element utilized in the apparatus shown in Figs. 9 and 11.
Fig. 13 is a detail cross-sectional view illustrating a cushioning device referred to as an hydraulic accumulator and also shown in Figs. 10 and 11.
Figs. 14, 15 and 16 are detail plan views showing parts of the change-over switch of the invention.
Fig. 17 is a fragmentary detail view of an accumulator.

In addition to the simple form of pressure surge control means comprised by the small orifice tube 22 I may, for larger diameter flow lines, employ a different type of snubbing device such as the snubber indicated by the arrow 22a in Fig. 12 and also shown in operating relationship with respect to a pump P' and a meter 11' in Fig. 9. As noted in said figure the snubber member 22a is located in a flow line 8' running between the pressure sensitive switch 20' and a coupling 24'.

The structure included in snubber 22a (Fig. 12) comprises a tubular body 30 which is divided into two compartments 32 and 34 by means of a partition 36 through which is formed a small orifice 38. This orifice is protected on both sides by strainers 38a and 38b. The fittings 40 and 42 at opposite ends of the tubular member serve to conveniently connect the snubber into the flow line at the point indicated in Fig. 9. The function of this member is, as noted above, to cushion and retard transmission of pressure pulses developed in the flow line 8 so that the effect of these pulses up to a certain point is largely minimized or neutralized.

In addition, pressure surge control, I find, may be achieved by electrical switch means such as has been illustrated in Figs. 18, 19, for example. The working of these switches will be described in connection with the detailed explanation of the entire electrical operating circuit hereinafter set forth.

Considering in greater detail the remaining essential parts of the control apparatus consisting of the electrical circuits and electrical elements which are controlled by the pressure sensitive switch 20, attention is directed to Figs. 1, 4, 5 and 6.

In response to a rise in pressure in the flow line 8 transmitted through the bellows element of the pressure switch 20, the contacts R2 are caused to move into an open circuit position. With a pressure drop the contacts R2 normally seek a closed position and this operates several branch circuits in which are connected a novel combination of relay means for starting and stopping the truck engine including what may be conveniently referred to as a starting relay and a sensitive relay arrangement for controlling the starting relay.

The nature of the novel relay means may be more fully understood and appreciated from a consideration of certain limiting factors which are encountered in electrically controlling the truck engine. A serious limitation of prior art automatic starting devices employing an electrical starter motor has been the inability to positively and dependably, as well as automatically, disengage the starting motor when the vehicle engine starts. Serious damage may, of course, result if the starter motor and engine run simultaneously. This difficulty is avoided in conventional starting devices by the use of starting buttons which must be held against a spring pressure and which cannot operate when released. Another alternative proposed has been to interrupt cranking after the engine starts by developing a generator voltage of sufficient magnitude to actuate a cut-off relay. Such relays have, up to the present time, required an operating voltage of from 5 to 6 volts.

A very important point to be noted here, however, is that with almost all standard makes of generators which are driven by an engine at idling speed, there will be developed only a small voltage, in some cases as low as, roughly, two-tenths of a volt, and no relays have been available of a sufficient sensitivity to satisfactorily operate on these voltages and yet withstand full generator voltages along with the other requirements involved. Obviously the driver in making an oil delivery will be at a remote point from the truck and cannot possibly increase the motor speed to build up a higher voltage.

A new and important feature of the present invention is that by using the control device the driver can be at a remote point when the engine starts and stops and no manual attention is needed to control the engine. This is accomplished by the use of a special sensitive relay operating in combination with a novel electrical circuit. The sensitive relay has been shown in Figs. 4, 5 and 6 and referred to as relay R3. It comprises a coil and armature operative on very small voltages as low as two-tenths of a volt, the electrical resistance of the coil being carefully chosen to meet with two conditions. It has been found that if a resistance load of less than 8 ohms, to be comprised by the winding of the relay, is placed in a generator circuit having a small voltage of from two-tenths to four-tenths volt, the generator output may be very materially reduced, for example, by as much as 80%. This would leave a net generator voltage insufficient to effect operation of even a sensitive type relay. It is also found, on the other hand, that if too high a resistance is used the voltage drop through the resistance will be too great to allow positive operation of the relay.

A desirable resistance value which I have found meets both of these conditions comprises a resistance value of 11 ohms, it being understood that this value may decrease to as low as 8 ohms for satisfactory results. By constructing the relay so that its electrical characteristics are thus limited, and by arranging the coils and relay structure to provide for a rapid dissipation of heat, it has been found that the relay will withstand the full generator output of 8 volts without damage, and will have a relatively long operating life. It should be noted, however, that the 11 ohm resistance specified as preferable, is designed for use with a 6 volt system. In the case of a 12 volt system it has been determined that a resistance of 70 ohms is a preferred resistance and will provide for satisfactory results.

The relay R3 is shown in detail in Fig. 6 and, as noted therein, includes a coil with a core or pole piece 70; an armature 72; an armature spring 74; and a contact arm 76 thereon. 78 is a stationary contact; and the connections are as shown. In a preferred form of the invention I may desire to electrically connect relay 3 to another relay 5, as has been indicated in Fig. 4, although I do not limit the invention to this specific combination, and I may use relay 3 independently of relay 5. Relay 5 does, however, furnish a very desirable performance by handling the inductive load of the solenoid switch through its contacts, thus permitting the sensitive relay contacts to handle the comparatively light electrical load of only the R5 coil.

In conjunction with this matter of devising a sensitive relay it has also been found that premature or accidental operation of the sensitive relay may take place because of another troublesome factor which has not heretofore been recognized. This factor involves the presence of a ground circuit voltage which may exist when the truck engine is being cranked. Experiments have shown that if a volt meter is set up with one side connected to the frame or body of the tank truck of the customary type and the other side of the volt meter is connected to the engine of the truck, there will be indicated voltages running as high as a half volt during the cranking cycle. This difference in potential is caused by inadequate grounding between the two points. It is pointed out that for all normal automotive uses such grounding is satisfactory, but the introduction of the sensitive relay of the invention makes this type of grounding a troublesome factor.

Figure 5:
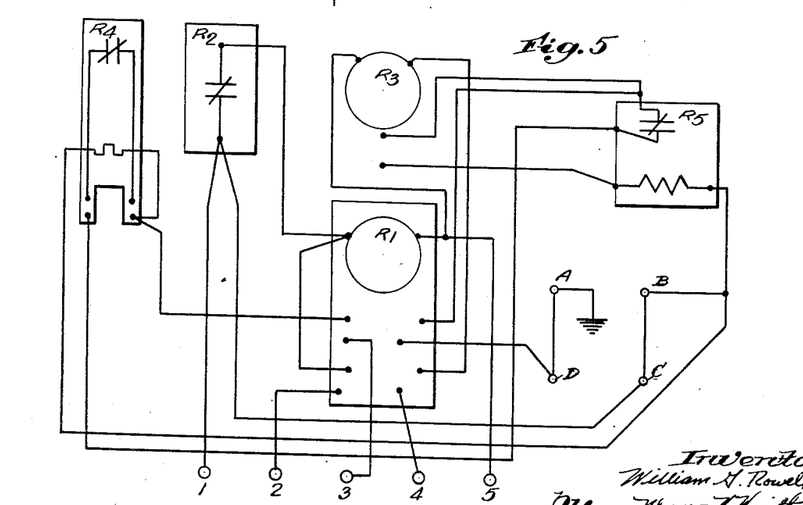
Fig. 5 is a detailed wiring diagram of the control apparatus connected into a part of the operating circuit of the tank truck, as shown in Figs. 1 and 3.

To prevent the sensitive relay from operating falsely on this voltage, therefore, I have found that the relay ground circuit should be connected independently of the frame or body of the truck and this may be carried out, for example, by connecting the relay ground circuit to the generator or the truck engine, as shown in Fig. 6 and also in Fig. 5. By thus excluding the voltage condition which is present when grounding through the frame of the truck, I am able to protect the sensitive relay and make certain that it performs its cut-off function in a highly efficient manner.

Figure 4:
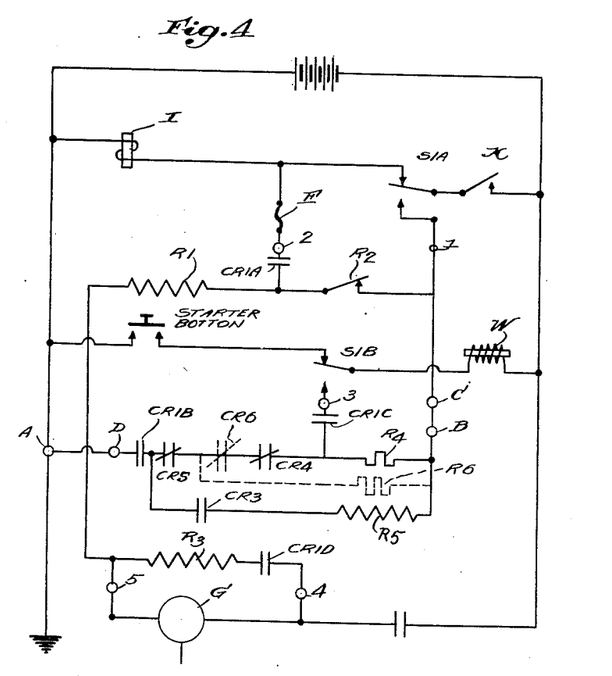
Fig. 4 is a schematic wiring diagram further illustrating parts of the control apparatus connected with electrical components of the truck ignition circuit.

Considering in detail the circuits shown in Figs. 1, 4 and 5, in which the relays and other special arrangements referred to are embodied, it is pointed out that one circuit is so arranged as to be actuated by a predetermined increase in pressure in the flow line and is further connected to the ignition circuit of the truck engine to open this circuit and stop the engine. Another circuit is actuated by a predetermined decrease of pressure in the flow line to actuate the starting motor and simultaneously close the ignition circuit of the truck engine. Still another circuit is connected to the generator output so that when a predetermined voltage is produced from the generator, such as is the case when the engine is running, it will function and stop the cranking operation. Several additional electrical elements operatively connected to other parts of the truck equipment are also combined in the circuits, as shown in the figures noted, to complete a desired range of control.

The starting circuit which closes the truck engine ignition circuit is, as shown in Figs. 1, 3, 4 and 5, from battery through the truck ignition key switch K; through one side of switch S1A to terminal 1 on the control unit; from terminal 1 through contacts of R2 of pressure switch 20 to coil R1 relay; and from coil of R1 relay through terminal 5 to ground on the generator G. It will be observed that R1, in operating, closes the ignition circuit from battery under control of R2 through contacts CR1A; through terminal 2; through fuse F, to the truck engine ignition coil I.

Closed simultaneously with the ignition circuit described is the electrical motor starting circuit which runs from ground to terminals A and D of the change-over switch; through contacts CR1B; through contacts CR5; to contacts CR4 of relay 4; to contacts CR1C of R1 through terminal 3 to S1B; and to the truck solenoid starting switch W. This circuit, when closed, causes the truck engine solenoid switch W to close its contacts in the usual manner and cause the electrical starting motor to crank the engine E.

The circuit for stopping the electric motor and interrupting the cranking cycle is from generator G through terminal 4; through the contacts CR1D; through the coil of sensitive relay R3 to terminal 5; to ground at generator G. The R3 sensitive relay, in operating as outlined, now closes a circuit to operate the R5 relay. The circuit is from battery to terminal 1; through terminals C and B of the change-over switch R7; through the coil of R5; through the contacts CR3; through the contacts CR1B; to terminals D and A, to ground. R5, in operating, opens the circuit, as previously outlined, to the starter solenoid switch W. This stops the cranking action.

The invention also includes provision for carrying out repetitive cranking. The need for such a device has been occasioned by the fact that for various reasons more than one cranking action may at times be necessary to start the internal combustion engine of the truck. One reason is that with some engines using a bendix type of starting motor, the engine may momentarily kick over and in so doing will disengage the starting motor which thereafter runs free. Another reason is that some engines, especially when in a truck parked on a steep grade, may have a tendency to load up with gas and require more than one cranking action before firing will take place.

The invention also provides for automatically carrying out repetitive cranking, making use of an electrical thermal relay. Such a thermal element R4 has been shown in Fig. 4. This relay functions in parallel with the starting or cranking circuit above described. If, for any reason, the truck engine fails to start and excessive cranking ensues, the contacts CR4 through which the cranking circuit is completed open and stop the cranking action. After a brief interval the R4 thermal relay cools and the contacts of R4 close and complete the cranking action. This cycle may be continued as long as desired.

However, I may wish to include an additional thermal relay as, for example, the relay R6 which may be used to limit the repetitive cranking cycles after a predetermined number of cranking periods have been completed. Fig. 4 shows this arrangement in dotted lines and the operation is such that adding the thermal element R6, as shown, may cause it to heat when the starting circuit is energized, and after a predetermined time, if the starting circuit remains energized, its contacts open and break the circuit to solenoid switch W. In the meantime the R4 thermal switch has been interrupting the cranking action at intervals. The R6 thermal relay, by being adjusted to give slower action than the R4 thermal relay, permits any predetermined number of starting cycles before the repetitive cranking action is stopped.

Once the relay R6 operates it holds the cranking circuit and the solenoid switch open. Turning the ignition switch K to "off" for a few moments permits the R6 thermal relay to cool and close its contacts CR6. Turning the ignition switch "on" again would permit a new starting cycle. The R6 thermal relay used alone allowed a single limited cranking action. The R4 thermal relay used alone permits intermittent cranking action. A combination of R6 and R4 thermal relays permits intermittent control as described.

The circuit shown in Fig. 4 may be modified to include time delay relay means in the manner illustrated in Figs. 18 and 19. The function of this type of apparatus is to control pressure surges in the flow line and to prevent momentary peak pressures from stopping the pumping operation prematurely.

Attention is directed to Fig. 18 in which a thermal relay R9 is provided. When S1A is in pump position relay R1 operates as previously described through the contacts of the pressure switch R2. When the engine and pump start, a momentary high pressure impulse causes the R2 contacts to be momentarily open. However, due to the thermal time delay circuit, this does not release the R1 relay which, when operated, is locked up through its own contacts CR1E under control of the thermal contacts CR9. The thermal switch R9 is in parallel with the relay R1, and therefore is energized every time the R1 relay is energized. However, after approximately two seconds of being energized, the thermal contacts CR9 open and release the locking circuit of the R1 relay, placing this relay under control of the pressure switch R2.

In addition to the thermal time delay circuit I may also employ as a pressure surge control means a slow release relay circuit, such as has been produced by modifying the circuit of Fig. 4 in the manner indicated in Fig. 19. As shown therein I provide a slow release relay R10. When the S1A is in pumping position, R10 relay operates upon R2 contacts of the pressure switch being closed. Contacts CR10 have been closed and the R1 relay operates through these contacts and in the usual manner, as previously described. The starter and ignition circuits are closed in the usual manner. When the engine and pump start, a momentary high pressure impulse is imparted to the pressure switch and the pressure switch contacts R2 momentarily open. However, this does not release the R1 relay because the operating path of this relay is under control of the R10 relay which, being a slow release relay, does not release upon a momentary opening of its operating circuit. With the exception of momentarily holding the R1 relay operated after the pressure switching contacts R2 open, the circuit functions as outlined previously.

I have also provided a novel change-over switch arrangement which is illustrated in Fig. 4 and whose terminals are further illustrated in Fig. 14. This change-over switching arrangement provides an easy and convenient method of adapting the control unit to either a battery or ground operated electrical starter solenoid switch for starting the truck engine. As will be noted from an inspection of Fig. 4, the starter solenoid switch on the truck is operated by a ground circuit from the push button switch on the dash of the truck. Some types of trucks require the solenoid switch to be operated by a battery circuit from the push button switch.

To meet both of these conditions I have provided a change-over switch arrangement which includes a terminal socket R7. In this socket is engaged a plug R8, as shown in Figs. 15 and 16. By removing the plug R8 and rotating it 90° and then reinserting it in the socket R7, the desired conversion from ground to battery operation can be made.

Terminals A and B will then be connected together as will terminals C and D on the change-over switch. The circuit to energize the starter solenoid switch will now be battery to terminal 1; through terminals C and D; through contacts CR1B; CR5; CR4; CR1C; terminal 3; S1B; to the solenoid W. In order to provide operation for R4 and R5, the ground circuit is supplied from terminals A and B of the change-over switch. Operation of the change-over switch in the alternate position from that shown in Fig. 4, merely reverses the battery and ground circuits of R4 and R5 and supplies battery instead of ground to the solenoid switch.

Another feature of the invention is the location of transfer switch S1 at a point such that it is necessary to operate it from the outside of the cab of the truck. The purpose of this switch, in combination with the other control apparatus, is to connect or disconnect the control apparatus with the existing starting and ignition circuits without interference with the normal operation of the truck. The switch S1 has two positions, drive and pump. When in drive position my device is electrically disconnected from the truck electrical circuits. When in pump position the truck electrical starting and ignition circuit is connected to my device and is then under control of the pressure sensitive switch.

When located outside of the cab the driver cannot reach both this switch and the truck gear shift lever. This has desirable safety features. For instance, assume that this switch is on the instrument panel. When the driver arrives at the delivery destination he engages the power take-off lever and turns the switch S1 from drive to pump position. This will stop the engine automatically when pressure exists in the delivery pump system. The possibility now exists that the driver may, with the engine stopped, accidentally push or hit the gear shift lever which may place the truck in gear. Then when the valve in the hose nozzle is opened to start a delivery, the truck may move ahead. With the switch location of the invention, as described above, this eventuality is not likely to take place.

I may also employ switches S2 and S3 which are operatively connected to the gear shift lever of the truck to provide a further safety factor, as shown in Fig. 20. These switches are connected in series between terminal 5 and the generator ground connection. The gear shift lever Y has mounted thereon the switches S2 and S3 which include plungers X and Z arranged to be operated when gear shift lever Y is moved into one or the other of two positions. If moved into a rearward position the plunger of switch S3 will be depressed and will thus open the circuit which runs through both of these switches. Placing the gear shift lever in first speed or in high driving speed would result in this movement. Alternatively, moving the gear shift forwardly into either a reverse speed or a second speed for standard type transmission, the switch S2 would have its plunger pressed and thus break the contacts.

With this arrangement the switches S2 and S3 are set so that they can close a circuit only when the gear shift lever is in a neutral position.

The invention has now been described in one form which has been found to be satisfactory and which includes, with the electrical circuits and relay elements described, a combination of mechanical components consisting of the pressure sensitive switch 20; the check valve 26; and a snubber member 22 comprising a small orifice tube. As has been pointed out above, this tube exercises its function of delaying the transmission of pressure surges from the main flow line to the pressure switch.

In place of this small orifice tube 22, and in addition to the snubber shown in Fig. 12, I have also found that very desirable results may be obtained by substituting a device commonly referred to as an hydraulic accumulator, one simple form of which has been illustrated in Fig. 13 of the drawings. As noted therein, the accumulator comprises a closed casing 90 which stores oil or other fluid under pressure. This is done by utilizing the pressure potential of air contained within a resilient member 92 in the accumulator. With introduction of fluid under pressure into the casing 90 the container is squeezed into a smaller size, such as has been indicated diagrammatically in Fig. 13 by the dotted outline 92a and forces air out through a connecting pipe 93.

In accordance with the invention I utilize a device of this character to take up excessive pressure surges in the flow line and, as shown in Fig. 10 of the drawings, I may locate the accumulator 90 between the flow line 8" and the pressure sensitive switch 20" by means of a connector pipe 93. In this position the accumulator 90 will receive pressure fluctuations coming through the flow line 8 and the coupling 24" without interference with the pump P" or with the delivery of oil through a meter 11", and the pressure fluctuations will be transmitted to the pressure switch in a delayed manner.

Another important aspect of the invention based upon the use of the hydraulic accumulator has to do with a common problem existing today in the tank truck field. This problem arises from the fact that the float ball in an air eliminator, such as the air eliminator 10 shown in Fig. 1, is subject to frequent collapse and failure. The frequency of failure is more or less determined by the developed pumping pressures which are utilized in a given truck. The higher the pumping pressure the greater the incidence of air eliminator failure. For instance, it has been observed on some installations that when pumping at 50 gals. per minute there is developed a pumping pressure of approximately 50 lbs. to the square inch. When the meter valve is suddenly closed, a peak pressure of as high as approximately 150 lbs. is developed, due to hydraulic shock. Such a force often collapses the ball float in the air eliminator. The hydraulic shock further has the disadvantage of locking the meter valve and tending to make it very difficult to manually reopen this member.

I have found that by providing an hydraulic accumulator of sufficient capacity, for example 25 to 30 cubic inches, I may substantially eliminate hydraulic shock pressures and avoid both of the difficulties referred to. The arrangement illustrated in Fig. 10 is intended to be illustrative of one suitable combination for accomplishing this objective.

I may also, with good results in some cases, use both an hydraulic accumulator and a snubber and such a combination has been shown in Fig. 11 of the drawings, in which is a flow line 8''' having a pump P''' and a meter 11''', together with a check valve 26'''. In this line, with a pressure sensitive switch 20''', I combine a snubber 22b of the character already described and an hydraulic accumulator 90'. In this latter arrangement the hydraulic accumulator 90' is connected at one side of the coupling 24''' so that it may function independently of the feed line running from the coupling 24''' to the pressure switch 20'''.

An accumulator with a closed end is used in this latter case and such a type of device is shown in Fig. 17 with a sealing cap 94. In this form of the device no fluid actually passes through the accumulator and all that happens is merely a compression of the air container in the accumulator. With this arrangement both increased cushioning action and a very desirable protective effect, as well as elimination of pressure drops from leaks, are all dealt with.

From the foregoing it will be apparent that I have devised a relatively simple, efficient and thoroughly practical control by which a truck operator may, through the medium of simply opening the valve in a hose nozzle, control the operation of his truck and the pumping mechanism which is driven by it, either stopping or starting these mechanisms at will. In thus achieving this control, all of the wear heretofore present on those pumping mechanisms is eliminated and, moreover, very substantial savings in gasolene consumed by the truck motor are realized. In working out for the first time a solution to the problem of automatic tank truck pumping there has been uncovered a number of unusual problems and I have devised ways of overcoming these problems in a highly satisfactory manner.

While I have described a preferred embodiment of the invention, I do not wish to limit it specifically thereto, and I may use parts, or all, of the invention in various other types of pumping mechanisms and in other unrelated ways, utilizing a part, or all, of the structure described, in keeping with the spirit of the invention as defined by the appended claims.

This application in part is a continuation of my earlier filed application Ser. No. 752,900, filed June 6, 1947, and entitled Control Apparatus for Metering Systems now abandoned.

I claim:

1. In a tank truck of the class having an internal combustion engine, an electrical starting motor for the engine, a generator driven by the engine, and an electrical circuit, the combination of a flow line, a pump for delivering fluid material through the flow line, a power take-off apparatus for operatively connecting the pump to the internal combustion engine of the truck, valve means connected at one end of the flow line for releasing material therefrom, a check valve located in the flow line between the pump and valve means for preventing a loss of pressure through the pump, and a pressure sensitive switch connected into the flow line after the check valve and in the direction of fluid flow, said electrical circuit having means associated with and operative in response to pressure changes transmitted by the pressure sensitive switch to automatically start and stop the truck engine and pump with the power take-off apparatus engaged, said electrical circuit means including a relay for controlling the operation of the said electrical starting motor, and sensitive relay means in said circuit for interrupting operation of the electrical starter motor, said sensitive relay means being operative in a normal voltage range produced by the said truck engine generator when the said truck engine is running at idling speed.

2. An apparatus according to claim 1, in which the electrical starting motor includes a solenoid switch, and said electrical circuit means includes a thermal relay connected in series with the solenoid switch for periodically deenergizing the said solenoid switch in order to produce a repetitive cycle for the electrical starting motor.

3. An apparatus according to claim 2, including a second thermal relay arranged in the circuit of the said first thermal relay to limit operation of the latter element.

4. In a pumping and control apparatus which includes an internal combustion engine, an electrical motor for starting the engine and a generator driven by the said engine, the combination of a flow line, pumping mechanism operatively connected to the engine for delivering fluid material through the flow line, valve means connected at one end of the flow line for releasing material therefrom, pressure sensitive means including a pressure sensitive switch connected into the flow line, electrical circuit means operative in response to pressure changes in the flow line transmitted by the pressure sensitive switch to automatically start and stop the internal combustion engine and pumping mechanism, said electrical circuit means including a relay for controlling the operation of the said electrical starting motor, and sensitive relay means in said circuit for interrupting operation of the electrical starter motor, said sensitive relay means including a wire wound coil, said coil having a number of turns and a wire diameter so chosen as to cooperate in producing a magnetic field of an operating intensity sufficient to energize and actuate the sensitive relay means when the latter is connected to the said engine driven generator operating at idling speed only.

5. In a pumping and control apparatus which includes an internal combustion engine, an electrical motor for starting the engine and a generator driven by the said engine, the combination of a flow line, pumping mechanism operatively connected to the engine for delivering fluid material through the flow line, valve means connected at one end of the flow line for releasing material therefrom, pressure sensitive means including a pressure sensitive switch connected into the flow line, electrical circuit means operative in response to pressure changes in the flow line transmitted by the pressure sensitive switch to automatically start and stop the internal combustion engine and pumping mechanism, said electrical circuit means including a relay for controlling the operation of the said electrical starting motor, and sensitive relay means in said circuit for interrupting operation of the electrical starter motor, said sensitive relay means including a wire wound coil, said coil having a number of turns and a wire diameter responsive to those generator voltages which are developed with the engine running at its lowest operating speed.

6. In a tank truck of the class having an internal combustion engine, a flow line, a pump operatively connected to the internal combustion engine of the truck and adapted to force fluid material through the flow line, valve means connected to one end of the flow line for releasing fluid material therefrom, a check valve located in the flow line between the pump and valve means for preventing a loss of pressure through the pump, a pressure-sensitive switch connected into the line after the check valve and in the direction of fluid flow, and electrical circuit means including a combination of relays in said circuit and operative in response to pressure changes occurring in the pressure-sensitive switch to automatically start and stop the truck engine and pump, pressure surge control means responsive to momentary peak pressures in the flow line to prevent interruption of the pumping mechanism when the latter is in operation, the said pressure surge control means including a relatively small orifice passageway arranged between the flow line and the pressure-sensitive switch, said small orifice passageway being substantially smaller in size than the passageway in the said flow line.

7. A structure as defined in claim 6, in which the pressure surge control means includes a pressure snubber consisting of a tubular body having a restricted passageway formed therein.

8. In a tank truck of the class having an internal combustion engine, the combination of a flow line, a pump operatively connected to the internal combustion engine of the truck and adapted to force fluid material through the flow line, valve means connected to one end of the flow line for releasing fluid material therefrom, a check valve located in the flow line between the pump and valve means for preventing a loss of pressure through the pump, a pressure sensitive switch connected into the line after the check valve and in the direction of fluid flow, electrical circuit means including a combination of relays in said circuit and operative in response to pressure changes occurring in the pressure sensitive switch to automatically start and stop the truck engine and pump, said electrical circuit means further including a change-over switch, said switch consisting of a socket and a plug element adapted to be engaged in the socket in either one of two positions to connect either a ground or a battery potential to the starting motor solenoid switch, the said solenoid switch when energized adapted to close an auxiliary circuit to the starting motor for cranking the truck engine.

9. In a tank truck of the class having an internal combustion engine, the combination of a flow line, a pump operatively connected to the internal combustion engine of the truck and adapted to force fluid materials through the flow line, valve means connected to one end of the flow line for releasing fluid material therefrom, a check valve located in the flow line between the pump and valve means for preventing a loss of pressure through the pump, a pressure sensitive switch connected into the line after the check valve and in the direction of fluid flow, electrical circuit means including a combination of relays in the circuit and operative in response to pressure changes occurring in the pressure sensitive switch to automatically start and stop the truck engine and pump, said electrical circuit means further including a thermal timing relay cooperating with the ignition and starting motor circuit of the engine to interrupt at intervals the starting motor circuit.

10. In a fluid dispensing apparatus, a flow line having a pumping mechanism therein, pressure sensitive means located in the line on the discharge side of the pumping mechanism, said pressure sensitive means being responsive to changes in pressure in the flow line, electrical circuit means including relays operated by the said pressure sensitive means to automatically start and stop the pumping mechanism, a check valve connected into the flow line between the pumping mechanism and the pressure sensitive means, said check valve being normally operative to close and prevent the loss of pressure back through the pumping mechanism, pressure surge control means connected in the flow line and responsive to momentary peak pressures in the flow line to prevent interruption of the pumping mechanism when the latter is in operation, said pressure surge control means further including a slow release relay member operatively connected in series therein to produce a time delay.

References Cited in the file of this patent

UNITED STATES PATENTS

| | | |
|---|---|---|
| 1,296,976 | Leonard | Mar. 11, 1919 |
| 1,302,596 | Schweinle et al. | May 6, 1919 |
| 1,565,854 | Hasselbring | Dec. 15, 1925 |
| 1,566,591 | Goldsmith et al. | Dec. 22, 1925 |
| 1,842,295 | Schurle | Jan. 19, 1932 |
| 1,893,685 | Pirsch | Jan. 10, 1933 |
| 1,975,311 | Creveling | Oct. 2, 1934 |
| 2,070,004 | Davis | Feb. 9, 1937 |
| 2,080,232 | Rogers et al. | May 11, 1937 |
| 2,240,607 | Buck | May 6, 1941 |
| 2,366,925 | May | Jan. 9, 1945 |
| 2,415,265 | Taylor | Feb. 4, 1947 |